(12) United States Patent
Otani

(10) Patent No.: US 10,412,297 B2
(45) Date of Patent: Sep. 10, 2019

(54) PHOTOGRAPHING APPARATUS CAPABLE OF BRACKETING PHOTOGRAPHY, PHOTOGRAPHING CONTROL METHOD, AND STORAGE MEDIUM

(71) Applicant: CASIO COMPUTER CO., LTD., Tokyo (JP)

(72) Inventor: Daisuke Otani, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 767 days.

(21) Appl. No.: 14/659,967

(22) Filed: Mar. 17, 2015

(65) Prior Publication Data

US 2015/0381882 A1    Dec. 31, 2015

(30) Foreign Application Priority Data

Jun. 30, 2014    (JP) ................................. 2014-135237

(51) Int. Cl.
*G06F 3/048* (2013.01)
*H04N 5/232* (2006.01)
(Continued)

(52) U.S. Cl.
CPC ....... *H04N 5/23216* (2013.01); *G06F 3/0488* (2013.01); *G06F 3/04847* (2013.01); *H04N 5/2356* (2013.01)

(58) Field of Classification Search
CPC .............. H04N 5/23216; H04N 5/2356; G06F 17/30047; G06F 3/04847; G06F 3/0488
(Continued)

(56) References Cited

U.S. PATENT DOCUMENTS 8,826,192 B1 *   9/2014  Rinckes .............. G06F 3/04847
                                                     345/173
2013/0063645 A1 *  3/2013  Aoyama ............ H04N 5/23293
                                                     348/333.01
(Continued)

FOREIGN PATENT DOCUMENTS

JP         2010-160581 A      7/2010
JP         2011-205228 A     10/2011
(Continued)

OTHER PUBLICATIONS

Office Action dated Aug. 4, 2015 for Japanese Patent Application No. 2014-135237 and English translation of the same. (2 pages).

*Primary Examiner* — Phuong H Nguyen
(74) *Attorney, Agent, or Firm* — Fitch, Even, Tabin & Flannery LLP

(57) ABSTRACT

A photographing apparatus includes an input unit, a distinction unit, a setting unit, and a photographing control unit. The input unit is constituted by a touch screen and enables a sliding operation according to touch. The distinction unit distinguishes a characteristic of a trajectory of a continuous (seamless) sliding operation on the touch screen. The setting unit respectively sets a plurality of values of photographing parameters used for the bracketing photography, according to the characteristics of the trajectory of the one continuous sliding operation thus distinguished. The photographing control unit controls to execute the bracketing photography with the plurality of values of the photographing parameters thus set.

20 Claims, 9 Drawing Sheets

(51) Int. Cl.
*G06F 3/0488* (2013.01)
*G06F 3/0484* (2013.01)
*H04N 5/235* (2006.01)

(58) Field of Classification Search
USPC .......................................................... 715/764
See application file for complete search history.

(56) References Cited

U.S. PATENT DOCUMENTS

2013/0179831 A1\* 7/2013 Izaki ................... G06F 3/04845
715/800
2013/0257762 A1\* 10/2013 Masuda ................... G06F 3/017
345/173

FOREIGN PATENT DOCUMENTS

| JP | 2013-9189 A | 1/2013 |
| JP | 2013-143644 A | 7/2013 |
| JP | 2014-048382 A | 3/2014 |

\* cited by examiner

FIG. 3

| PHOTOGRAPHING ORDER FLAG | SETTING METHOD OF PHOTOGRAPHING ORDER |
|---|---|
| 0 | START LOCATION IS PRIORITIZED |
| 1 | SMALLER VALUE IS PRIORITIZED |
| 2 | LARGER VALUE IS PRIORITIZED |

FIG. 4

| MOVING VELOCITY [cm/s] | NUMBER OF TIMES PHOTOGRAPHING |
|---|---|
| AT LEAST V3 | 3 |
| AT LEAST V2, LESS THAN V3 | 5 |
| AT LEAST V1, LESS THAN V2 | 7 |
| LESS THAN V1 | 9 |

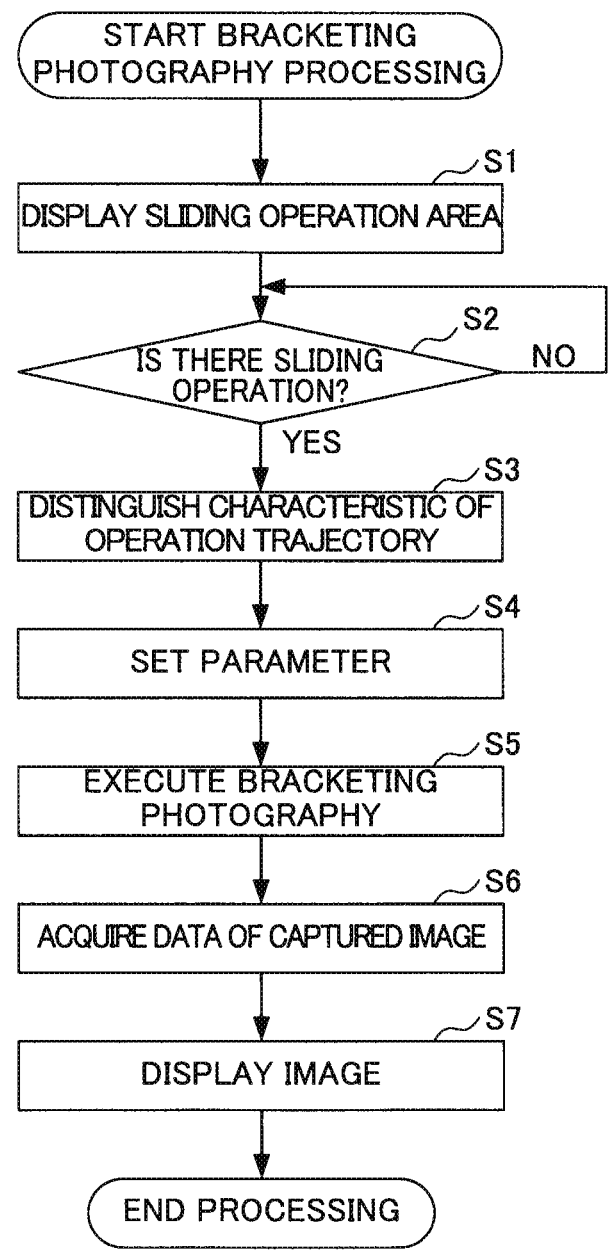

FIG. 8

| MOVING VELOCITY [cm/s] | SHIFT AMOUNT [Ev] |
|---|---|
| AT LEAST V3 | 2 |
| AT LEAST V2 AND LESS THAN V3 | 3/2 |
| AT LEAST V1 AND LESS THAN V2 | 1 |
| LESS THAN V1 | 1/2 |

PHOTOGRAPHING APPARATUS CAPABLE OF BRACKETING PHOTOGRAPHY, PHOTOGRAPHING CONTROL METHOD, AND STORAGE MEDIUM

CROSS-REFERENCE TO RELATED APPLICATION

The present application claims the benefit of the priority of Japanese Patent Application No. 2014-135237, filed in Japan on Jun. 30, 2014, the subject matter of which is hereby incorporated herein by reference.

BACKGROUND OF THE INVENTION

Field of the Invention

The present invention relates to a photographing apparatus, a photographing control method, and a storage medium.

Related Art

Conventionally, bracketing photography has been widely used that consecutively performs photography a plurality of times while changing the values of photographing parameters to acquire desired photographed images. When performing bracketing photography, a proper value for a photographing parameter to be changed differs depending on the photographing environment, and it is troublesome to set a plurality of values for photographing parameters every time photographing.

Japanese Unexamined Patent Application, Publication No. 2014-48382 discloses a technology configuring so that a center reference value can be easily set using a touch screen.

SUMMARY OF THE INVENTION

An photographing apparatus according to a first aspect of the present invention is a photographing apparatus that can perform bracketing photography which performs photographing for a plurality of times while changing a value of a photographing parameter, including: a touch input section that can perform a sliding operation according to touch; a distinction section that distinguishes a location of a start point and a location of an end point of the sliding operation on the touch input section as a characteristic of a trajectory of the sliding operation on the touch input section which is one continuous sliding operation; a setting section that sets a plurality of values that is the photographing parameter used for the bracketing photography, according to the start point and the end point on the touch input section distinguished; and a photographing control section that controls to execute the bracketing photography with the plurality of values of the photographing parameter set.

A photographing apparatus according to a second aspect of the present invention is a photographing apparatus that can perform bracketing photography which performs photographing for a plurality of times while changing a plurality of combinations made by combining a plurality of values for each kind of a plurality of photographing parameters, including: a touch input section that can perform a sliding operation by a touch in multiple dimensions; a distinction section that distinguishes a characteristic of a trajectory of the sliding operation in multiple dimensions on the touch input section that is one continuous sliding operation; a setting section that sets each of a plurality of combinations made by combining a plurality of values for each of a plurality of kinds of the photographing parameters used for the bracketing photography, according to the characteristic of the trajectory of the one continuous sliding operation distinguished; and a photographing control section that controls to execute the bracketing photography with the plurality of combinations set.

A photographing control method according to a third aspect of the present invention is a photographing method executed by a photographing apparatus that can perform bracketing photography which performs photographing for a plurality of times while changing values of a photographing parameter, the photographing apparatus including a touch input section that can perform a sliding operation according to touch, the method including the steps of: distinguishing a location of a start point and a location of an end point of the sliding operation on the touch input section as a characteristic of a trajectory of the sliding operation on the touch input section that is one continuous sliding operation; setting a plurality of values that is the photographing parameter used for the bracketing photography, according to the start point and the end point on the touch input section distinguished; and controlling to execute the bracketing photography according to the plurality of values of the photographing parameter set.

A photographing control method according to a fourth aspect of the present invention is a photographing method executed by a photographing apparatus that can perform bracketing photography which performs photographing for a plurality of times while changing a plurality of combinations made by combining a plurality of values for each kind of a plurality of photographing parameters, the photographing apparatus including a touch input section that can perform a sliding operation according to touch in multiple dimensions, the method including the steps of: distinguishing a characteristic of a trajectory of the sliding operation in multiple dimensions on the touch input section that is one continuous sliding operation; setting each of a plurality of combinations made by combining a plurality of values for each of a plurality of kinds of the photographing parameters used for the bracketing photography, according to the characteristic of the trajectory of the one continuous sliding operation distinguished; and controlling to execute the bracketing photography according to the plurality of combinations set.

A non-transitory storage medium encoded with a computer-readable program according to a fifth aspect of the present invention is a non-transitory storage medium encoded with a computer-readable program enabling a computer, which controls a photographing apparatus that can perform bracketing photography which performs photographing for a plurality of times while changing values of a photographing parameter and that includes a touch input section that can perform a sliding operation by a touch, to realize: a distinction function that distinguishes a location of a start point and a location of an end point of the sliding operation on the touch input section as a characteristic of a trajectory of the sliding operation on the touch input section that is one continuous sliding operation; a setting function that sets a plurality of values that is the photographing parameter used for the bracketing photography, according to the start point and the end point on the touch input section distinguished; and a photographing function that controls to execute the bracketing photography according to the plurality of values of the photographing parameter set.

A non-transitory storage medium encoded with a computer-readable program according to a sixth aspect of the present invention is a non-transitory storage medium encoded with a computer-readable program enabling a computer, which controls a photographing apparatus that can perform bracketing photography which performs photographing for a plurality of times while changing a plurality of combinations made by combining a plurality of values for each kind of a plurality of photographing parameters and that includes a touch input section that can perform a sliding operation according to touch in multiple dimensions, to realize: a distinction function that distinguishes a characteristic of a trajectory of the sliding operation in multiple dimensions on the touch input section that is one continuous sliding operation; a setting function that sets each of a plurality of combinations made by combining a plurality of values for each of a plurality of kinds of the photographing parameters used for the bracketing photography, according to the characteristic of the trajectory of the one continuous sliding operation distinguished; and a photographing control function that controls to execute the bracketing photography with the plurality of combinations set.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The following detailed descriptions of the invention can provide deeper understanding of the present application with reference to the drawings.

FIG. 3 is a schematic view illustrating a photographing order table that associates photographing order flags with the setting methods of photographing orders within a range of photographing parameters;

FIG. 4 is a schematic view illustrating a standard number of times photographing table that associates moving velocities of sliding operations with the setting method of the number of times photographing;

FIG. 6 is a flowchart illustrating a flow of the bracketing photography processing executed by the photographing apparatus of FIG. 1 having the functional configuration of FIG. 2;

FIG. 8 is a schematic view illustrating a standard photography shift amount table which associates moving velocities of sliding operations with a setting method of set increment/decrement of a photographing parameter according to modified example 1;

DETAILED DESCRIPTION OF THE INVENTION

Embodiments of the present invention are explained below with reference to the drawings.

First Embodiment

Configuration

Figure 1:
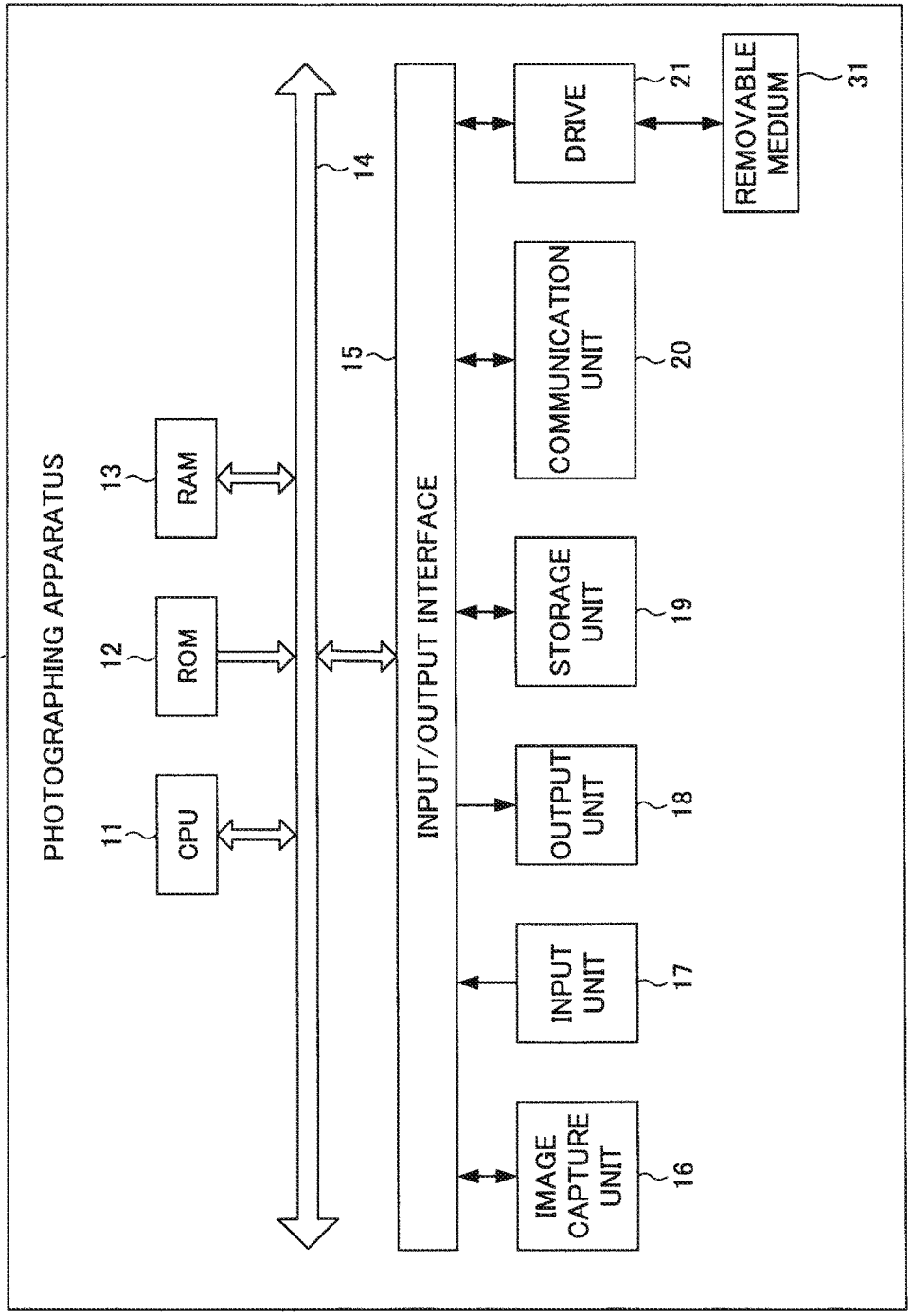
FIG. 1 is a block diagram illustrating the hardware configuration of a photographing apparatus according to an embodiment of the present invention.

FIG. 1 is a block diagram showing the hardware configuration of a photographing apparatus according to an embodiment of the present invention.

The photographing apparatus 1 is configured as, for example, a digital camera.

The photographing apparatus 1 include a CPU (Central Processing Unit) 11, ROM (Read Only Memory) 12, RAM (Random Access Memory) 13, a bus 14, an input/output interface 15, an image capture unit 16, an input unit 17, an output unit 18, a storage unit 19, a communication unit 20, and a drive 21.

The CPU 11 executes various processing according to programs that are recorded in the ROM 12, or programs that are loaded from the storage unit 19 to the RAM 13.

The RAM 13 also stores data and the like necessary for the CPU 11 to execute the various processing, as appropriate.

The CPU 11, the ROM 12 and the RAM 13 are connected to one another via the bus 14. The input/output interface 15 is also connected to the bus 14. The image capture unit 16, the input unit 17, the output unit 18, the storage unit 19, the communication unit 20, and the drive 21 are connected to the input/output interface 15.

The image capture unit 16 includes an optical lens unit and an image sensor, which are not shown.

In order to photograph a subject, the optical lens unit is configured by a lens such as a focus lens and a zoom lens for condensing light.

The focus lens is a lens for forming an image of a subject on the light receiving surface of the image sensor. The zoom lens is a lens that causes the focal length to freely change in a certain range.

The optical lens unit also includes peripheral circuits to adjust setting parameters such as focus, exposure, white balance, and the like, as necessary.

The image sensor is configured by an optoelectronic conversion device, an AFE (Analog Front End), and the like.

The optoelectronic conversion device is configured by a CMOS (Complementary Metal Oxide Semiconductor) type of optoelectronic conversion device and the like, for example. Light incident through the optical lens unit forms an image of a subject in the optoelectronic conversion device. The optoelectronic conversion device optoelectronically converts (i.e. captures) the image of the subject, accumulates the resultant image signal for a predetermined time interval, and sequentially supplies the image signal as an analog signal to the AFE.

The AFE executes a variety of signal processing such as A/D (Analog/Digital) conversion processing of the analog signal. The variety of signal processing generates a digital signal that is output as an output signal from the image capture unit 16.

Such an output signal of the image capture unit 16 is hereinafter referred to as "captured image". The captured images are supplied as appropriate to the CPU 11, etc.

The input unit 17 is configured by a touch screen laminated on a display of the output unit 18, and inputs a variety of information in accordance with instructions and operations by the user. Furthermore, the input unit 17 is configured to include various buttons and the like in addition to the touch screen, and inputs a variety of information in accordance with instructions and operations by the user. In the present embodiment, the X-axis is established as the horizontal direction and the Y-axis is established as the vertical direction on the touch screen of the input unit 17, and an operation (for example, tapping, sliding, etc.) on the touch screen is detected as X-Y coordinates. It should be noted that the touch screen includes a contact-type touch screen and a non-contact-type touch screen.

The output unit 18 is configured by the display unit, a speaker, and the like, and outputs images and sound.

The storage unit 19 is configured by DRAM (Dynamic Random Access Memory) or the like, and stores data of various images.

The communication unit 20 controls communication with other devices (not shown) via networks including the Internet.

A removable medium 31 composed of a magnetic disk, an optical disk, a magneto-optical disk, semiconductor memory or the like is installed in the drive 21, as appropriate. Programs that are read via the drive 21 from the removable medium 31 are installed in the storage unit 19, as necessary. Similarly to the storage unit 19, the removable medium 31 can also store a variety of data such as the image data stored in the storage unit 19.

Figure 2:
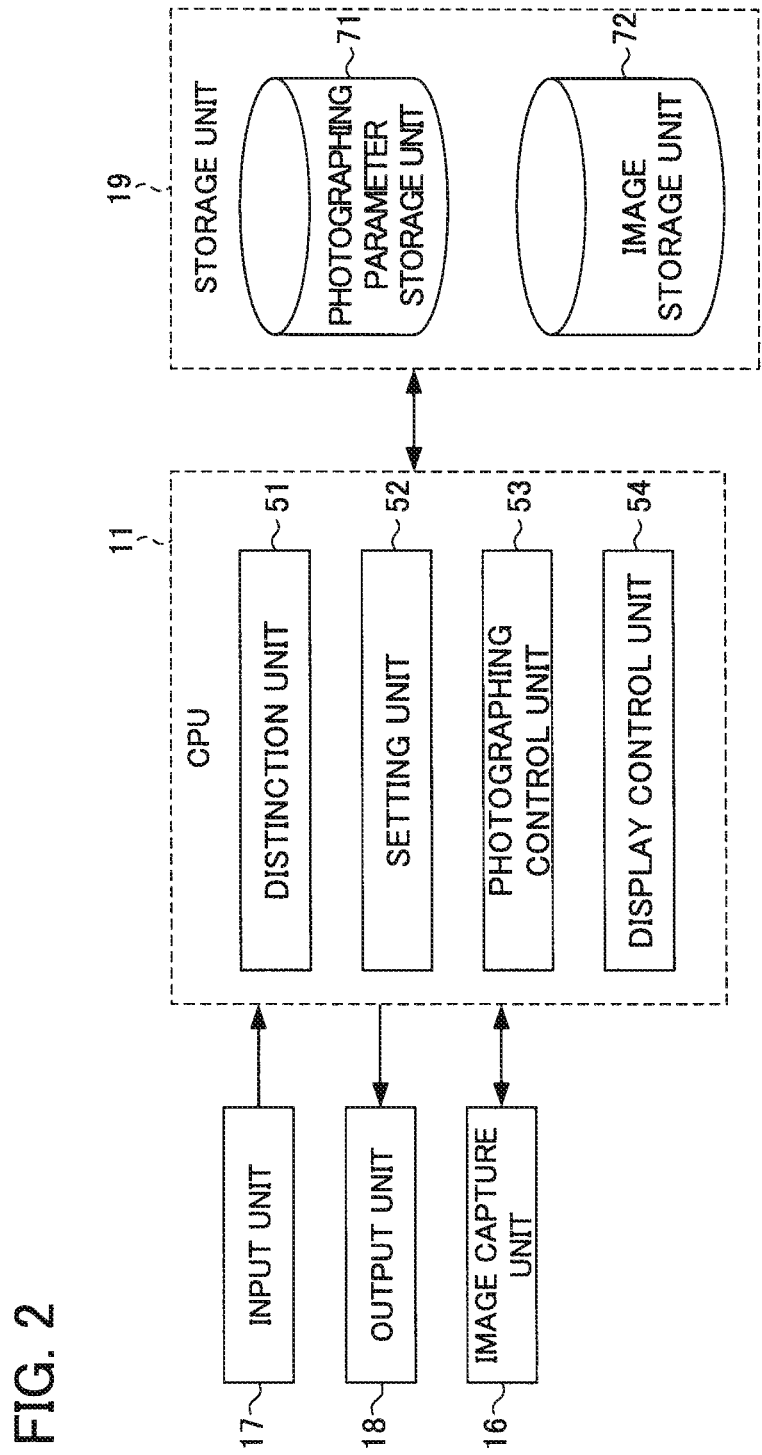
FIG. 2 is a functional block diagram illustrating a functional configuration for executing bracketing photography processing among the functional configurations of the photographing apparatus in FIG. 1.

FIG. 2 is a functional block diagram illustrating a functional configuration for executing bracketing photography processing among the functional configurations of the photographing apparatus 1.

The bracketing photography processing refers to a sequence of processing of distinguishing a characteristic of a trajectory of a user's operation on the input unit 17 to set a parameter for bracketing photography, and executing the bracketing photography automatically according to the parameter set.

When the bracketing photography processing is executed, as illustrated in FIG. 2, a distinction unit 51, a setting unit 52, a photographing control unit 53, and a display control unit 54 function in the CPU 11.

Furthermore, a photographing parameter storage unit 71 and an image storage unit 72 are established in a region of the storage unit 19.

In the photographing parameter storage unit 71, parameters for the bracketing photography set by the setting unit 52 are stored as appropriate.

In the image storage unit 72, photographed images photographed according to the control of the photographing control unit 53 are stored.

The distinction unit 51 distinguishes a characteristic of a trajectory of a user's operation on the input unit 17. More specifically, the distinction unit 51 detects a trajectory of one-time sliding operation performed while user keeps being in contact with the input unit 17, and distinguishes elements such as a location, a direction or a velocity of the sliding operation indicated by the trajectory as a characteristic of the trajectory of the operation. For example, the distinction unit 51 distinguishes a start location, an end location, an intermediate location therebetween of the sliding operation, or a pause location on the way (a location where a sliding operation is temporarily stopped at least for a setting time period during the sliding operation), moving amount in the vertical direction or the horizontal direction (X direction or Y direction) on the touch screen, a moving velocity, etc., as characteristics of a trajectory of the operation. In the present embodiment, the distinction unit 51 detects a sliding operation as a trajectory of one-axis (one-dimension). In the setting unit 52, a plurality of setting values of one kind of photographing parameter and the order of photographing using these setting values are set according to the sliding operation. It should be noted that, in the present embodiment, a photographing parameter to be changed when performing the bracketing photography is an exposure correction value.

The setting unit 52 sets a value of a photographing parameter used for the bracketing photography according to a characteristic of the trajectory of the operation distinguished by the distinction unit 51. More specifically, the setting unit 52 sets a range of the photographing parameter based on the start location and the end location of the sliding operation detected as the one-axis (one-dimension) trajectory. For example, the setting unit 52 sets a sliding operation from a photographing parameter Ps corresponding to the start location of the sliding operation until a photographing parameter Pe corresponding to the end location thereof, as the range of the photographing parameter. Furthermore, the setting unit 52 sets the number of times photographing of the bracketing photography according to the moving velocity of the sliding operation. At this time, according to a photographing order flag that determines the photographing order, the setting unit 52 sets which order is used for performing the bracketing photography within the range of the photographing parameters. The photographing order flag is set by the user via the input unit 17.

FIG. 3 is a schematic view illustrating a photographing order table that associates the photographing order flag with a setting method of photographing order within a range of photographing parameters.

As illustrated in FIG. 3, when the photographing order flag is set to "0", a start location of a sliding operation is prioritized, and thus the first photographing is performed with a photographing parameter Ps corresponding to the start location of the sliding operation. Then, after the photographing is performed in the order close to the photographing parameter Ps and in the order of the photographing parameter changed according to the number of times photographing, the final photographing is performed with the photographing parameter Pe corresponding to the end location of the sliding operation.

Furthermore, when the photographing order flag is set to "1", the minimum (smaller) value in the range of the photographing parameter set by the sliding operation is prioritized, and thus the first photographing is performed with this minimum (smaller) value. Then, after the photographing is performed in the order close to the minimum (smaller) value in the range of the photographing parameter and in the order of the photographing parameter changed according to the number of times photographing, the final photographing is performed with the maximum (larger) value in the range of the photographing parameter.

Furthermore, when the photographing order flag is set to "2", the maximum (larger) value is prioritized in the range of the photographing parameter set by the sliding operation, and thus the first photographing is performed with this maximum (larger) value. Then, after the photographing is performed in the order close to the maximum (larger) value in the range of the photographing parameter and in the order of the photographing parameter changed according to the number of times photographing, the final photographing is performed with the minimum (smaller) value in the range of the photographing parameter.

FIG. 4 is a schematic view illustrating a standard number of times photographing table that associates moving velocities of a sliding operation with setting methods of the number of times photographing. It should be noted that the moving velocities has a relationship of V3>V2>V1 in the following explanation.

As illustrated in FIG. 4, when the moving velocity is at least V3, the number of times photographing is set to three, and when the moving velocity is at least V2 and less than V3, the number of times of photographing is set to five. Furthermore, when the moving velocity is at least V1 and less than V2, the number of times photographing is set to seven, and when the moving velocity is less than V1, the number of times photographing is set to nine.

Herein, the setting methods of the number of times photographing illustrated in FIG. 4 correspond to the case of performing a sliding operation over the whole range of the area (hereinafter, referred to as "sliding operation area") in which multi-level values of the photographing parameters are displayed as a scale on the display on which the touch screen is laminated. In a case in which an actual sliding operation does not reach the whole range of the sliding operation area, the number of times photographing is limited according to the number of multi-level photographing parameters included in the range in which the sliding operation is performed.

FIG. 5 is a schematic view illustrating setting examples of photographing parameters when a photographing order flag is set to "0".

As illustrated in FIG. 5, when a sliding operation (an arrow in the drawings) is performed in various patterns in a one-dimension sliding operation area in which a scale showing exposure correction value is displayed, a photographing parameter for the bracketing photography is set according to a characteristic of a trajectory of an operation in the sliding operation.

Herein, for the photographing parameter, any of the values corresponding to each scale ("−2", "−1", "−½", "0", "+½", "+1", "+2") is set.

Figure 5A:
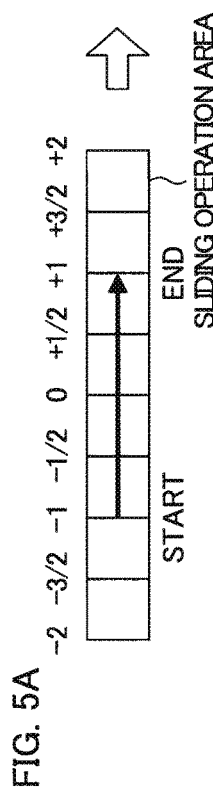
FIGS. 5A, 5B, 5C, 5D, and 5E are schematic views illustrating setting examples of photographing parameters when a photographing order flag is set as "0"

For example, as illustrated in FIG. 5A, when a start location of the sliding operation is the location of "−1" of the photographing parameter and an end location thereof is the location of "+1" of the photographing parameter in the sliding operation area, the first photographing is performed with "−1" of the photographing parameter and the final photographing is performed with "+1" of the photographing parameter. Furthermore, the number of times of the bracketing photography is set according to the moving velocity of the sliding operation. More specifically, when the moving velocity [cm/s] is at least V3, the number of times photographing is set to three, and the bracketing photography is performed in the order of "−1", "0", and "+1" of the photographing parameter. Furthermore, when the moving velocity is at least V2 and less than V3, the number of times photographing is set to five, and the bracketing photographing is performed in the order of "−1", "−½", "0", "+½", "+1" of the photographing parameter. Furthermore, even when the moving velocity is at least V1 and less than V2, and less than V1, since a value does not exist that can be set to seven and nine for the corresponding number of times of photographing, the number of times photographing is set to five, and the bracket photographing is performed in the order of "−1", "−½", "0", "+½", and "+1" of the photographing parameter.

Figure 5B:
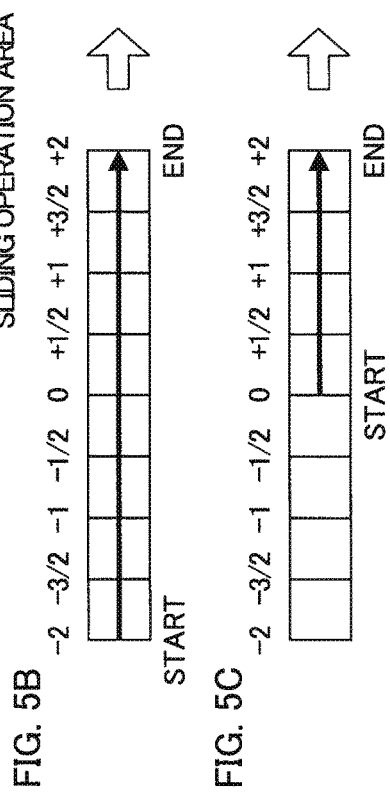

Furthermore, as illustrated in FIG. 5B, when the start location of the sliding operation is the location of "−2" of the photographing parameter and the end location thereof is the location of "+2" of the photographing parameter in the sliding operation area, the first photographing is performed with "−2" of the photographing parameter and the final photographing is performed with "+2" of the photographing parameter. Furthermore, the number of times of the bracketing photography is set according to the moving velocity of the sliding operation. More specifically, when the moving velocity is at least V3, the number of times photographing is set to three, and the bracketing photography is performed in the order of "−2", "0", and "+2" of the photographing parameter. Furthermore, when the moving velocity is at least V2 and less than V3, the number of times photographing is set to five, and the bracketing photography is performed in the order of "−2", "−1", "0", "+1", and "+2" of the photographing parameter. Furthermore, when the moving velocity is at least V1 and less than V2, the number of times photographing is set to seven, and the bracketing photography is performed in the order of "−2", "−1", "−½", "0", "+½", "+1", and "+2" of the photographing parameter. As seen above, when it is not possible to set at values of equal intervals, setting is made by prioritizing a value close to "0" which is the center. Furthermore, when the moving velocity is less than V1, the number of times photographing is set to nine, and the bracketing photography is performed in the order of "−2", "−3⁄2", "−1", "−½", "0", "+½", "+1", "+3⁄2", and "+2" of the photographing parameter.

Figure 5C:
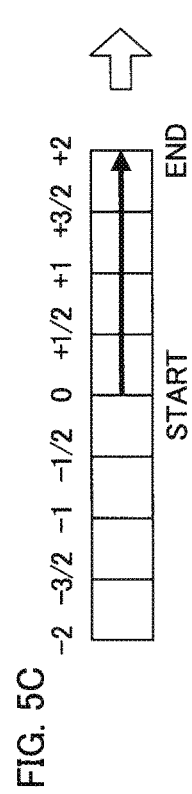

Furthermore, as illustrated in FIG. 5C, when the start location of the sliding operation is the location of "0" of the photographing parameter and the end location thereof is the location of "+2" of the photographing parameter in the sliding operation area, the first photographing is performed with "0" of the photographing parameter and the final photographing is performed with "+2" of the photographing parameter. Furthermore, the number of times of the bracketing photography is set according to the moving velocity of the sliding operation. More specifically, when the moving velocity [cm/s] is at least V3, the number of times photographing is set to three, and the bracketing photography is performed in the order of "0", "+1", and "+2" of the photographing parameter. Furthermore, when the moving velocity is at least V2 and less than V3, the number of times photographing is set to five, and the bracketing photographing is performed in the order of "0", "+½", "1", "+3⁄2", and "+2" of the photographing parameter. Even when the moving velocity is at least V1 and less than V2, or less than V1, since a value does not exist that can be set to seven and nine for the corresponding number of times photographing, the number of times photographing is set to five, and the bracketing photography is performed in the order of "0", "+½", "1", "+3⁄2", and "+2" of the photographing parameter.

Figure 5D:
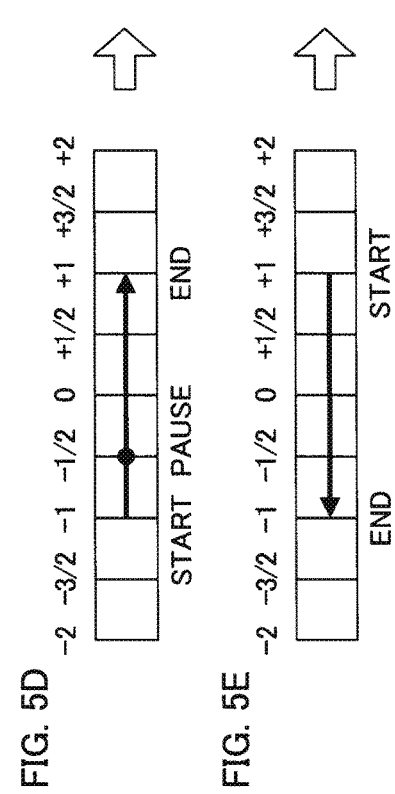

Furthermore, as illustrated in FIG. 5D, when the start location of the sliding operation is the location of "−1" of the photographing parameter, a pause location on the way (the location of the black dot in the drawings) is the location of "−½" of the photographing parameter, and the end location thereof is the location of "+1" of the photographing parameter in the sliding operation area, the first photographing is performed with "−1" of the photographing parameter, intermediate photographing is performed by prioritizing "−½" of the photographing parameter at which the pause was performed, and the final photographing is performed with "+1"

of the photographing parameter. Furthermore, the number of times of the bracketing photography is set according to the moving velocity of the sliding operation. More specifically, when the moving velocity [cm/s] is at least V3, the number of times photographing is set to three, and the bracketing photography is performed in the order of "−1", "−½", and "+1" of the photographing parameter. Furthermore, when the moving velocity is at least V2 and less than V3, the number of times photographing is set to five, and the bracketing photographing is performed in the order of "−1", "−½", "0", "+½", "+1" of the photographing parameter. Furthermore, even when the moving velocity is at least V1 and less than V2, or less than V1, since a value does not exist that can be set to seven and nine for the corresponding number of times of photographing, the number of times photographing is set to five, and the bracket photographing is performed in the order of "−1", "−½", "0", "+½", and "+1" of the photographing parameter. As seen above, when the sliding operation is temporarily stopped on the way, photographing with a photographing parameter corresponding to a pause location on the way is included in the number of times photographing that is set.

Figure 5E:
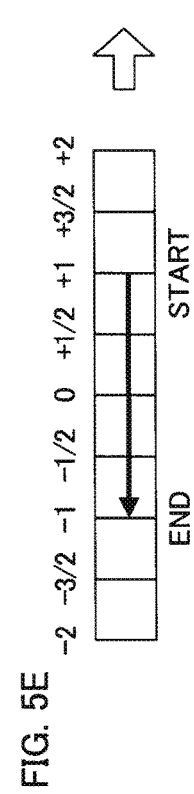

Furthermore, as illustrated in FIG. 5E, when the start location of the sliding operation is the location of "+1" of the photographing parameter and the end location thereof is the location of "−1" of the photographing parameter in the sliding operation area, the first photographing is performed with "+1" of the photographing parameter and the final photographing is performed with "−1" of the photographing parameter. Furthermore, the number of times of the bracketing photography is set according to the moving velocity of the sliding operation. More specifically, when the moving velocity [cm/s] is at least V3, the number of times photographing is set to three, and the bracketing photography is performed in the order of "+1", "0", and "−1" of the photographing parameter. Furthermore, when the moving velocity is at least V2 and less than V3, the number of times photographing is set to five, and the bracketing photographing is performed in the order of "+1", "+½", "0", "−½", "−1" of the photographing parameter. Furthermore, even when the moving velocity is at least V1 and less than V2, or less than V1, since a value does not exist that can be set to seven and nine for the corresponding number of times of photographing, the number of times photographing is set to five, and the bracket photographing is performed in the order of "+1", "+½", "0", "−½", and "−1" of the photographing parameter. As seen above, the photographing order is set according to the direction of performing the sliding operation (positional relationship between the start location and the end location).

With reference to FIG. 2 again, the photographing control unit 53 executes the bracketing photography according to the number of times photographing, the photographing parameter, and the photographing order which are set by the setting unit 52. More specifically, the photographing control unit 53 creates photographed images by performing filing processing on data of captured images acquired by causing the image capture unit 16 to execute image capturing for the number of times photographing while shifting the photographing parameter in the order of the photographing parameter set by the setting unit 52. A plurality of photographed images photographed by this bracketing photography is stored in the image storage unit 72.

The display control unit 54 reads data of a plurality of photographed images photographed by the bracketing photography from the image storage unit 72 and displays on the display of the output unit 18. At this time, it is possible, for example, to simultaneously display the data of a plurality of photographed images photographed by the bracketing photography by arranging on the display or display the data one by one sequentially in the order photographed or in an ascending order or a descending order. Furthermore, the display control unit 54 displays a scale (refer to FIG. 5) of a photographing parameter constituting the sliding operation area on the display of the output unit 18. It should be noted that it is possible to form the sliding operation area along a direction of a long side of the display (i.e., horizontal direction) or along a direction of a short side of the display (i.e., vertical direction).

Operation

Operations will be explained next.

FIG. 6 is a flowchart illustrating a flow of the bracketing photography processing executed by the photographing apparatus 1 of FIG. 1 having the functional configuration of FIG. 2.

The bracketing photography processing starts with an operation to start bracketing photography processing to the input unit 17 by a user.

When the bracketing photography processing starts, in Step S1, the display control unit 54 displays a scale of a photographing parameter constituting a sliding operation area on the display of the output unit 18.

In Step S2, the distinction unit 51 judges whether there is a sliding operation by the user on the input unit 17.

If there is a sliding operation by the user on the input unit 17, it is judged as YES in Step S2, and the processing advances to Step S3.

On the other hand, if there is not a sliding operation by the user on the input unit 17, it is judged as NO in Step S2, and the processing of Step S2 is repeated.

In Step S3, the distinction unit 51 distinguishes a characteristic of a trajectory of the user's operation on the input unit 17. With such a configuration, elements such as a location of a sliding operation indicated by the trajectory of the sliding operation (a start location, an end location, a pause location on the way, etc.), a direction (vertical direction or horizontal direction), a speed, etc., is distinguished as a characteristic of the trajectory of the operation.

In Step S4, the setting unit 52 sets a value of a photographing parameter used for the bracketing photography as describe above, according to the characteristic of the trajectory of the operation distinguished by the distinction unit 51. With such a configuration, the number of times of photographing, the photographing parameter, and the photographing order for performing the bracketing photography are set.

In Step S5, the photographing control unit 53 executes the bracketing photography with the number of times photographing, the photographing parameter, and the photographing order set by the setting unit 52. With such a configuration, once the sliding operation by the user ends, captured images with the photographing parameter and the number of times photographing thus set are captured by the bracketing photography in the order thus set.

In Step S6, the photographing control unit 53 causes the image storage unit 72 to store photographed images on which filing processing is performed by acquiring data of captured images outputted from the image capture unit 16.

In Step S7, the display control unit 54 reads data of a plurality of photographed images photographed from the image storage unit 72 and displays on the display of the output unit 18. For example, the display control unit 54 simultaneously displays the data of a plurality of photographed images photographed by the bracketing photography by arranging on the display, or displays the data one by one sequentially in the order photographed or in an ascending order or a descending order.

After Step S7, the bracketing processing is repeated until the operation of ending the bracketing photography processing is performed via the input unit 17.

With the above such processing, in the photographing apparatus 1, the number of times photographing for the bracketing photography is determined, and furthermore, the photographing parameter and the photographing order are set, based on the characteristic of the sliding operation performed by the user on the touch screen. Then, captured images with the photographing parameter and the number of times of photographing thus set are captured in the order thus set.

Therefore, since it is possible to perform various settings for the bracketing photography simply by a sliding operation on the touch screen, it becomes possible for the user to set a value of a photographing parameter used for the bracketing photography more easily.

Second Embodiment

A second embodiment of the present invention will be explained next.

In the first embodiment described above, the sliding operation is detected as a one-axis (one-dimension) trajectory. On the other hand, the present embodiment as another embodiment is characterized in that the sliding operation is detected as a two-axis (two-dimension) trajectory so as to able to set photographing parameters for two-axis bracketing photography.

The two-axis bracketing photography performs bracketing photography by combining a plurality of values set with each of two kinds of photographing parameters. If the setting values of two kinds of photographing parameters includes five and three, respectively, photographing is performed 15 times with 15 (5×3) different combinations.

A hardware configuration and a functional configuration of the photographing apparatus 1 in the present embodiment is similar to those in the first embodiment illustrated in FIGS. 1 and 2, except for the functional configurations of the distinction unit 51 and the setting unit 52.

Therefore, functional configurations of a distinction unit 51 and a setting unit 52 which are different from those in the first embodiment are mainly described.

The distinction unit 51 distinguishes a characteristic of a trajectory of the user's operation to the input unit 17. More specifically, the distinction unit 51 detects a trajectory of one sliding operation performed while the user keeps being in contact with the input unit 17 and distinguishes elements such as a location, a direction or a velocity of the sliding operation shown by the trajectory as a characteristic of the trajectory of the operation. For example, the distinction unit 51 distinguishes a start location, an end location, an intermediate location therebetween of the sliding operation, or a pause location on the way, moving amounts in the vertical direction or the horizontal direction (X direction or Y direction) on the touch screen, a moving velocity, etc., as a characteristic of the trajectory of the operation. In the present embodiment, the distinction unit 51 detects a sliding operation as a trajectory of two axes (two dimensions). In the setting unit 52, a plurality of setting values of two kinds of photographing parameters corresponding to the X-direction and Y-direction, respectively, and the order of photographing using these setting values are set according to the sliding operation. It should be noted that, in the present embodiment, the two kinds of photographing parameters to be changed when performing the bracketing photography are a contrast correction value and a saturation correction value.

The setting unit 52 sets a value of a photographing parameter used for the bracketing photography according to a characteristic of the trajectory of the operation distinguished by the distinction unit 51. More specifically, the setting unit 52 sets a range of the photographing parameters based on the start location, a transitting location (shape of the trajectory of an operation), and the end location of the sliding operation detected as the two-axis (two-dimension) trajectory. For example, if the sliding operation has a trajectory of monotonically increasing or decreasing, the setting unit 52 sets the sliding operation from a photographing parameter Ps corresponding to the start location of the sliding operation until a photographing parameter Pe corresponding to the end location thereof, as the range of the photographing parameters. On the other hand, if the sliding operation has a convex upwards or convex downwards trajectory, the setting unit 52 sets the sliding operation from a photographing parameter Ps corresponding to the start location of the sliding operation or a photographing parameter Pe corresponding to the end location thereof until a peak value Pp of the trajectory, as the range of the photographing parameters. Furthermore, the setting unit 52 sets the number of times photographing of the bracketing photography according to a moving velocity of the sliding operation. At this time, according to a photographing order flag for determining a photographing order, the setting unit 52 sets which order is used for performing the bracketing photography within the range of the photographing parameters. The photographing order flag is set by the user via the input unit 17.

In the present embodiment, regarding the photographing order flag, the photographing order flag which is similar to the case of the first embodiment illustrated in FIG. 3 is set for the two kinds of photographing parameters corresponding to the two axes, respectively.

Furthermore, regarding the number of times photographing, similarly to the case of the first embodiment illustrated in FIG. 4, the number of times photographing is set according to the moving velocity of the sliding operation. It should be noted that, similarly to the first embodiment, in a case in which an actual sliding operation does not reach the whole range of the sliding operation area, the number of times photographing is limited according to the number of multi-level photographing parameters included in the range in which the sliding operation is performed. For example, if the multi-level contrast correction value included in the range in which the sliding operation is performed is two and the multi-level contrast correction value included in the range in which the sliding operation is performed is three, photographing is performed 6 (2×3) times.

FIG. 7 is a schematic view illustrating examples of sliding operations in sliding operation areas.

In the present embodiment, since a sliding operation is detected as a two-axis (two-dimension) trajectory, as shown in FIG. 7, sliding operation areas are displayed as two-dimensional areas in which the scales of the vertical direction (Y-direction) and the horizontal direction (X-direction) are displayed. In the following explanation, the photographing order flag is set to "0".

Figure 7A:
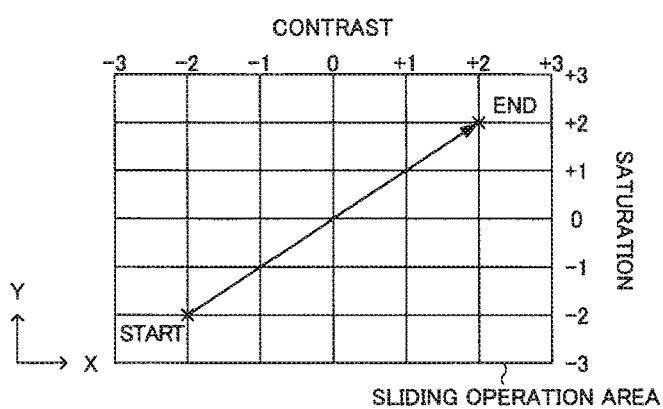
FIGS. 7A, 7B, 7C, and 7D are schematic views illustrating examples of sliding operations in sliding operation areas according to another embodiment.

As illustrated in FIG. 7A, in a sliding operation area, when the start location of a sliding operation is the location of "−2" of contrast and the location of "−2" of saturation, saturation of the sliding operation increases monotonically in proportion to the increase of contrast, and the end location of the sliding operation is the location of "+2" of contrast and the location of "+2" of saturation, the bracketing photography is performed by combining contrast and saturation in the order of "−2", "0", and "+2" of contrast and in the order of "−2", "0", and "+2" of saturation, according to the moving velocity of the sliding operation, for example.

Figure 7B:
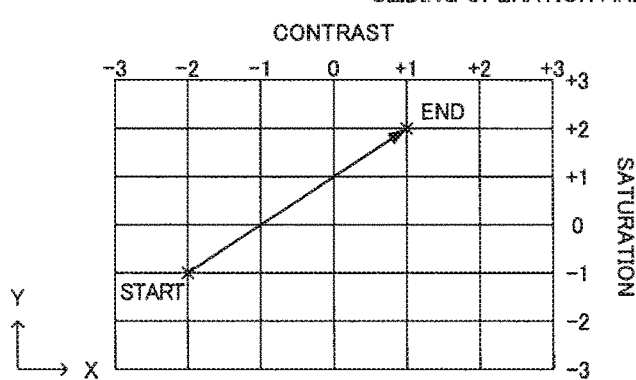

As illustrated in FIG. 7B, in a sliding operation area, when the start location of a sliding operation is the location of "−2" of contrast and the location of "−1" of saturation, saturation of the sliding operation increases monotonically in proportion to the increase of contrast, and the end location of the sliding operation is the location of "+1" of contrast and the location of "+2" of saturation, the bracketing photography is performed by combining contrast and saturation in the order of "−2", "0", and "+1" of contrast and in the order of "−1", "0", and "+2" of saturation, according to the moving velocity of the sliding operation, for example. Here, although the shift amount is not set with equal intervals, as seen above, setting is made by prioritizing a value close to "0" which is the center.

As seen above, although saturation monotonically increases in proportion to the increase of contrast in the sliding operations shown in both FIGS. 7A and 7B, since the trajectories differ therebetween, the combinations of the values set differ therebetween.

Figure 7C:
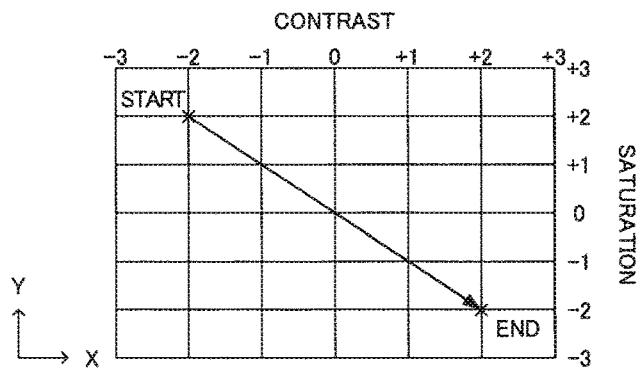

Furthermore, as illustrated in FIG. 7C, in a sliding operation area, when the start location of a sliding operation is the location of "−2" of contrast and the location of "+2" of saturation, saturation of the sliding operation decreases monotonically in inverse proportion to the increase of contrast, and the end location of the sliding operation is the location of "+2" of contrast and the location of "−2" of saturation, the bracketing photography is performed by combining contrast and saturation in the order of "−2", "0", and "+2" of contrast and in the order of "+2", "0", and "−2" of saturation, according to the moving velocity of the sliding operation, for example.

Figure 7D:
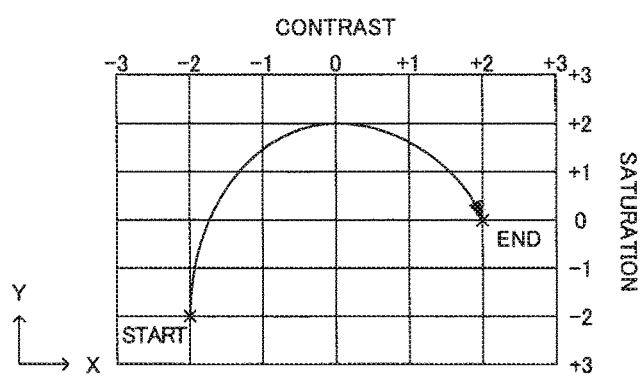

As illustrated in FIG. 7D, in a sliding operation area, when the start location of a sliding operation is the location of "−2" of contrast and the location of "−2" of saturation, a peak value (maximum value) of the sliding operation is the location of "0" of contrast and the location of "+2" of saturation, and the end location of the sliding operation is the location of "+2" of contrast and the location of "0" of saturation, the bracketing photography is performed by combining contrast and saturation in the order of "−2", "0", and "+2" of contrast and in the order of "−2", "+2", and "0" of saturation, according to the moving velocity of the sliding operation, for example.

As seen above, since the moving ranges of the sliding operations in FIGS. 7A, 7C, and 7D are between "−2" to "+2" of both contrast and saturation, correction values set and the number of times of the bracketing photography by combining the correction values become the same. However, since the trajectories thereof differ therebetween, the photographing orders differ therebetween. FIG. 7A differs in that saturation increases monotonically with respect to the increase of contrast, FIG. 7C differs in that saturation decreases monotonically with respect to the increase of contrast, and FIG. 7D differs in that the trajectory becomes upwards convex with respect to the increase of contrast.

In such cases, the combination of correction values used for contrast and saturation, respectively, is the same. On the other hand, the photographing orders differ.

In other words, it becomes possible to set the photographing order easily upon performing the bracketing photography by detecting the sliding operation as the two-axis (two-dimension) trajectory.

It should be noted that, in the second embodiment, in order to allow at least three-axis (three-dimension) touch input, the touch input means is not limited to a touch screen, and thus, for example, it may be configured so as to detect a sliding operation on a three-dimensional space.

Furthermore, in the second embodiment, the bracketing photography is performed by combining a plurality of values set by each of the two kinds of photographing parameters for the two-axis bracketing photography. However, it may also be configured so as to photograph only a combination on a trajectory of a sliding operation among the setting values of the two kinds of photographing parameters. For example, in the case of FIG. 7A, photographing is performed three times with the combinations of contrast being "−2" and saturation being "−2", contrast being "0" and saturation being "0", and contrast being "+2" and saturation being "+2".

Modified Example 1

In each of the abovementioned embodiments, the setting unit 52 sets the number of times photographing for the bracketing photography according to the moving velocity of a sliding operation. However, it may be configured so as to set a shift amount of a photographing parameter for the bracketing photography according to the moving velocity of a sliding operation. In this case, for the photographing order, it is possible to set the photographing order according to the photographing order flag using the photographing order table shown in FIG. 3.

FIG. 8 is a schematic view illustrating a standard photography shift amount table which associates moving velocities of sliding operations with a setting method of set increment/decrement of a photographing parameter.

As illustrated in FIG. 8, when the moving velocity is at least V3, the shift amount [Ev] of a photographing parameter is set to "2". When the moving velocity is at least V2 and less than V3, the shift amount of the photographing parameter is set to "⅔". Furthermore, when the moving velocity is at least V1 and less than V2, the shift amount of the photographing parameter is set to "1". When the moving velocity is less than V1, the shift amount of the photographing parameter is set to "½".

Here, the setting method for the shift amount of the photographing parameter shown in FIG. 8 corresponds to a case of performing a sliding operation over the whole range of the sliding operation area on the display screen of the touch screen. In a case in which an actual sliding operation does not reach the whole range of the sliding operation area, the magnitude of the shift amount for the photographing parameter is limited according to values that can be assumed by multi-level photographing parameters included in the range in which the sliding operation is performed.

Figure 9:
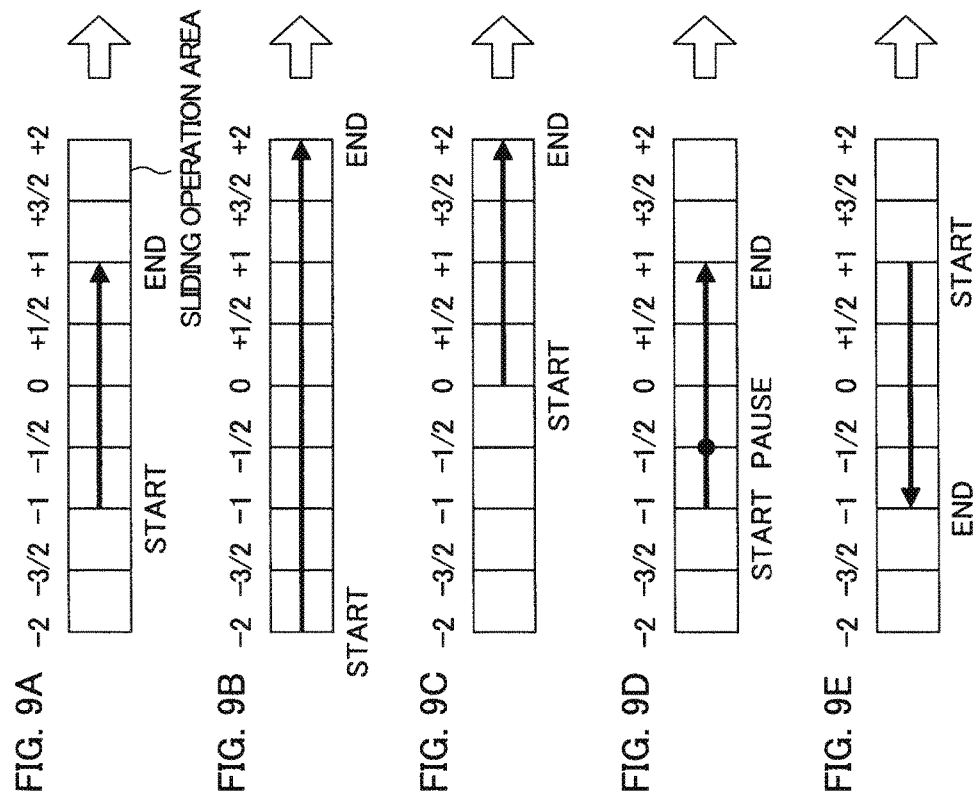
FIGS. 9A, 9B, 9C, 9D, and 9E are schematic views illustrating setting examples of photographing parameters in a case in which a photographing order flag is set as "0" in modified example 1.

FIG. 9 is a schematic view illustrating a setting example of a photographing parameter in a case of applying modified example 1 to the first embodiment and the photographing order flag being set to "0".

As illustrated in FIG. 9, when sliding operations are performed in various patterns in a sliding operation area, a photographing parameter for the bracketing photography is set according to a characteristic of the trajectory of the operation of the sliding operation.

For example, as illustrated in FIG. 9A, when the start location of the sliding operation is the location of "−1" of the photographing parameter and the end location of the sliding operation is the location of "+1" of the photographing parameter, the first photographing is performed with "−1" of the photographing parameter and the final photographing is performed with "+1" of the photographing parameter. Furthermore, a shift amount of the photographing parameter for the bracketing photography is set according to the moving velocity of the sliding operation. More specifically, when the moving velocity [cm/s] is at least V3, or at least V2 and less than V3, the respective corresponding shift amount are "2" and "⅔". However, since the respective shift amount cannot be secured between the start location and the end location, "1" is set as the shift amount that can be secured, and then, along with the case of at least V1 and less than V2 which can secure "1" of the shift amount, the bracketing photography is performed in the order of "−1", "0", and "+1" of the photographing parameter. Furthermore, when the moving velocity is less than V1, the shift amount of the photographing parameter is set to "½", and the bracketing photography is performed in the order of "−1", "−½", "0", "+½", and "+1" of the photographing parameter.

Furthermore, as illustrated in FIG. 9B, when the start location of the sliding operation is the location of "−2" of the photographing parameter and the end location of the sliding operation is the location of "+2" of the photographing parameter, the first photographing is performed with "−2" of the photographing parameter and the final photographing is performed with "+2" of the photographing parameter. Furthermore, a shift amount of the photographing parameter for the bracketing photography is set according to the moving velocity of the sliding operation. More specifically, when the moving velocity is at least V3, the shift amount of the photographing parameter is set to "2", and the bracketing photography is performed in the order of "−2", "0", and "+2" of the photographing parameter. Furthermore, when the moving velocity is at least V2 and less than V3, the shift amount of the photographing parameter is set to "1", and the bracketing photography is performed in the order of "−2", "−1", "0", "+1", and "+2" of the photographing parameter. Furthermore, when the moving velocity is at least V1 and less than V2, the shift amount of the photographing parameter is set to "⅔". However, if there is not a value that corresponds thereto, a value close to "0" which is the center is prioritized, and the bracketing photography is performed in the order of "−2", "−1", "−½", "0", "+½", "+1", and "+2". Furthermore, when the moving velocity is less than V1, the shift amount of the photographing parameter is set to "½", and the bracketing photography is performed in the order of "−2", "−3/2", "−1", "−½", "0", "+½", and "+1", "+3/2", and "+2" of the photographing parameter.

Furthermore, as illustrated in FIG. 9C, when the start location of the sliding operation is the location of "0" of the photographing parameter and the end location of the sliding operation is the location of "+2" of the photographing parameter, the first photographing is performed with "0" of the photographing parameter and the final photographing is performed with "+2" of the photographing parameter. Furthermore, a shift amount of the photographing parameter for the bracketing photography is set according to the moving velocity of the sliding operation. More specifically, when the moving velocity [cm/s] is at least V3, or at least V2 and less than V3, the respective corresponding step increments/decrements are "2" and "⅔". However, since the respective step increments/decrements cannot be secured between the start location and the end location, "1" is set as the shift amount that can be secured, and then, along with the case of at least V1 and less than V2 which can secure "1" of the shift amount, the bracketing photography is performed in the order of "0", "+1", and "+2" of the photographing parameter. Furthermore, when the moving velocity is less than V1, the shift amount of the photographing parameter is set to "½", and the bracketing photography is performed in the order of "0", "+½", "1", "+3/2", and "+2" of the photographing parameter.

Furthermore, as illustrated in FIG. 9D, when the start location of the sliding operation is the location of "−1" of the photographing parameter, a pause location on the way is the location of "−½" of the photographing parameter, and the end location of the sliding operation is the location of "+1" of the photographing parameter, the first photographing is performed with "−1" of the photographing parameter, the intermediate photographing is performed with "−½" of the photographing parameter, and the final photographing is performed with "+1" of the photographing parameter. Furthermore, a shift amount of the photographing parameter for the bracketing photography is set according to the moving velocity of the sliding operation. In this case, the value corresponding to the pause location is prioritized over setting the shift amount with equal intervals. More specifically, when the moving velocity [cm/s] is at least V3, or at least V2 and less than V3, the respective corresponding shift amounts are "2", "3/2", and "1". Therefore, the bracketing photography is performed in the order of "−1", "−½", and "+1" of the photographing parameter so that "−½" of the value designated as being temporarily stopped is included. Furthermore, when the moving velocity is less than V1, the shift amount of the photographing parameter is set to "½", and the bracketing photography is performed in the order of "−1", "−½", "0", "+½", and "+1" of the photographing parameter. As seen above, if the sliding operation is stopped temporarily on the way, the shift amount of the photographing parameter set is defined according to the pause location.

Furthermore, as illustrated in FIG. 9E, when the start location of the sliding operation is the location of "+1" of the photographing parameter and the end location of the sliding operation is the location of "−1" of the photographing parameter, the first photographing is performed with "+1" of the photographing parameter and the final photographing is performed with "−1" of the photographing parameter. Furthermore, a shift amount of the photographing parameter for the bracketing photography is set according to the moving velocity of the sliding operation. More specifically, when the moving velocity [cm/s] is at least V3, or at least V2 and less than V3, the respective corresponding step increments/decrements are "2" and "⅔". However, since the respective step increments/decrements cannot be secured between the start location and the end location, "1" is set as the shift amount that can be secured, and then, along with the case of at least V1 and less than V2 which can secure "1" of the shift amount, the bracketing photography is performed in the order of "+1", "0", and "−1" of the photographing parameter. Furthermore, when the moving velocity is less than V1, the shift amount of the photographing parameter is set to "½", and the bracketing photography is performed in the order of "+1", "+½", "0", "−½", and "−1" of the photographing parameter.

With such a configuration, in the photographing apparatus 1 according to the modified example 1, the shift amount of the photographing parameter for the bracketing photography is determined based on a characteristic of the sliding operation performed by the user on the touch screen, and furthermore, the photographing parameter and the photographing order are set. Then, captured images at the photographing parameter set with a predetermined shift amount are captured in the order thus set.

Therefore, since it is possible to perform various settings for the bracketing photography by way of a sliding operation on a touch screen, it becomes possible for a user to set a value of a photographing parameter used for the bracketing photography more easily.

Although the abovementioned explanation refers to the case applied to the first embodiment, the descriptions may be applied to the second embodiment, and similar operational effects can be obtained in the latter case as well.

Modified Example 2

In each of the abovementioned embodiments, explanations are provided with the distinction unit 51 distinguishing the moving velocity of a sliding operation as a characteristic of the sliding operation, and the setting unit 52 setting the setting conditions of a photographing parameter corresponding to the moving velocity (for example, the number of times photographing or a shift amount of a photographing parameter). On the other hand, it may also be configured so that, in place of the moving velocity of the sliding operation, the distinction unit 51 distinguishes a moving amount in a specific direction on a display screen and the setting unit 52 sets setting conditions of the abovementioned photographing parameter according to the moving amount.

Figure 10:
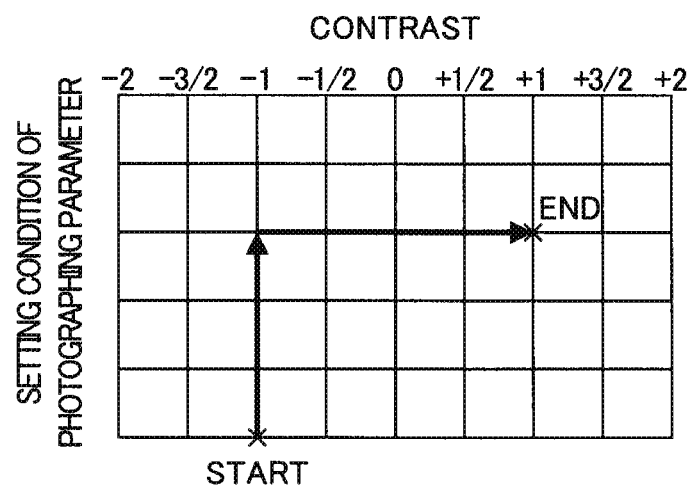
FIG. 10 is a schematic view illustrating an example of a sliding operation for setting a setting condition of a photographing parameter based on a moving amount in the vertical direction on a display of the modified example 2.

FIG. 10 is a schematic view illustrating an example of a sliding operation for setting a setting condition of a photographing parameter based on a moving amount in a vertical direction on a display. It should be noted that an example of setting a contrast correction value by way of a sliding operation in a horizontal direction is illustrated in FIG. 10.

As illustrated in FIG. 10, it is possible to perform setting of a setting condition of a photographing parameter based on a moving amount in the vertical direction by performing a sliding direction in the vertical direction on the display at the start location or the end location of a sliding operation. For example, in a case of setting the number of times photographing by the sliding operation in the vertical direction, it is possible to set the greater number of times photographing as the moving amount in the vertical direction becomes bigger. Furthermore, in a case of setting the shift amount of the photographing parameter by way of the sliding operation in the vertical direction, it is possible to set the shift amount of the photographing parameter to be greater as the moving amount in the vertical direction becomes bigger.

It should be noted that it is possible to set the range of a photographing parameter and a photographing order, similarly to the abovementioned embodiments, by the sliding operation in the horizontal direction by combining with the setting of a parameter by way of the sliding operation in the vertical direction.

The photographing apparatus 1 configured as above includes the input unit 17, the distinction unit 51, the setting unit 52, and the photographing control unit 53.

The input unit 17 constitutes a touch screen and allows a sliding operation by way of touching.

The distinction unit 51 distinguishes a characteristic of a trajectory of one continuous (seamless) sliding operation on a touch screen.

The setting unit 52 sets a plurality of values of photographing parameters used for the bracketing photography, respectively, according to the characteristics of the trajectory of the one continuous sliding operation thus distinguished.

The photographing control unit 53 controls to execute the bracketing photography with the plurality of values of the photographing parameters thus set.

With such a configuration, in the photographing apparatus 1, the plurality of values of the photographing parameter for the bracketing photography is set, respectively, based on the characteristic of the sliding operation performed by the user on the touch screen. Then, the bracketing photography is executed with the photographing parameters thus set.

Therefore, since it is possible to perform various settings for the bracketing photography simply by a sliding operation on the touch screen, it becomes possible for the user to set a value of a photographing parameter used for the bracketing photography more easily.

In addition, the photographing apparatus 1 further includes the display control unit 54.

The input device 17 is laminated on the output unit 18.

The display control unit 54 causes the output unit 18 to perform display that can identify a value or a range for which a photographing parameter set by the setting unit 52 can be set.

With such a configuration, it is possible to display a region for setting a photographing parameter of the bracketing photography by way of the sliding operation with an easily-understandable form for a user.

Furthermore, the distinction unit 51 distinguishes the location of the start point or the end point of a sliding operation on a touch screen as a characteristic of a trajectory of the sliding operation.

The setting unit 52 sets at least one among a plurality of values of a photographing parameter according to the location on the touch screen thus distinguished.

In this way, it is possible to set a photographing parameter for the bracketing photography easily via the touch screen.

Furthermore, the setting unit 52 sets a maximum value or a minimum value as at least one among the plurality of values of a photographing parameter.

In this way, it becomes possible for a user to set a maximum value or a minimum value of the photographing parameter for the bracketing photography with an intuitive, easily-understandable operation.

Furthermore, the distinction unit 51 distinguishes an intermediate location on the trajectory of a sliding operation on the touch screen as a characteristic of the trajectory of the sliding operation.

The setting unit 52 sets one among a plurality of values of a photographing parameter according to the intermediate location thus distinguished on the touch screen.

With such a configuration, by performing the sliding operation, it becomes possible to perform the bracketing photography by automatically setting a photographing parameter corresponding to an intermediate point of the photographing parameter between the start point and the end point.

Furthermore, the setting unit 52 sets one among the plurality of values of a photographing parameter that is set so as to be a value closer to an intermediate value (a center value in a range for which a photographing parameter can be set) among the values of the photographing parameter that can be set.

In this way, even in a case in which the intermediate value in the range of the photographing parameter is a value that cannot be set, it is possible to execute bracketing photography by setting the photographing parameter more appropriately.

Furthermore, the distinction unit 51 distinguishes a transitting location of the trajectory of a sliding operation as a characteristic of the trajectory of the sliding operation.

The setting unit 52 sets an order to change a plurality of values of a photographing parameter as an order in which to perform the bracketing photography according to the transitting location of the trajectory of the sliding operation thus distinguished.

With such a configuration, by making the trajectory of the sliding operation in various forms, it becomes possible to set the photographing order by each of the photographing parameters for the bracketing photography according to the forms. For this reason, even in a case of the photographing parameter being the shutter speed and when photographing a subject moving at high speed, etc., since the photographing result will differ according to the photographing order, if a user can set the order, it will be more likely to acquire a desirable result. Furthermore, in a case of captured images being displayed in the order photographed at the time of replaying, it is possible to set in an order that is easily viewable.

Furthermore, the distinction unit 51 distinguishes a direction of a trajectory of a sliding operation as a characteristic of the trajectory of the sliding operation.

The setting unit 52 sets an order to change a plurality of values of a photographing parameter as an order to perform the bracketing photography according to the direction of the trajectory of the sliding operation thus distinguished.

In this way, it is possible to set the photographing order by each of the photographing parameters for the bracketing photography with an intuitive, easily-understandable operational form for a user.

Furthermore, the distinction unit 51 distinguishes the velocity of a sliding operation as a characteristic of a trajectory of the sliding operation.

The setting unit 52 sets the number of the plurality of values of the photographing parameter as the number of times performing the bracketing photography, according to the velocity of the sliding operation thus distinguished.

In this way, it is possible to easily set the number of times photographing by the bracketing photography by way of one sliding operation.

Furthermore, the distinction unit 51 distinguishes the velocity of a sliding operation as a characteristic of a trajectory of the sliding operation.

The setting unit 52 sets a shift amount of a plurality of values of a photographing parameter according to the velocity of the sliding operation thus distinguished.

In this way, it is possible to easily set the shift amount of the photographing parameter for the bracketing photography by way of one sliding operation.

Furthermore, when there is pause for at least a predetermined period of time in the middle of a sliding operation, as a characteristic of the trajectory of the sliding operation, the distinction unit 51 distinguishes a location on the touch screen at which was this pause.

The setting unit 52 sets at least one among a plurality of values of a photographing parameter according to the location on the touch screen thus distinguished.

In this way, it is possible for a user to easily set a desirable photographing parameter for the bracketing photography by temporarily stopping the sliding operation at a predetermined location.

Furthermore, the setting unit 52 sets a plurality of values of a photographing parameter without including an intermediate value (standard photographing parameter in bracketing photography) among the values of the photographing parameter that can be set.

In this way, it is possible to set a range of the photographing parameter more flexibly according to a user's requirements. For example, in a case of becoming underexposed with automatic exposure control due to, for example, standard centrally weighted photometry or average photometry as in backlighting, and thus minus correction has no effect, it becomes possible to perform a fine setting only with plus correction without limiting the center value to an appropriate value measured by the automatic exposure control.

Furthermore, the photographing control unit 53 executes the bracketing photography at the end of distinguishing by the distinction unit 51 and setting by the setting unit 52.

In this way, it becomes possible to execute the bracketing photography automatically along with the completion of a sliding operation.

Furthermore, the distinction unit 51 distinguishes a moving amount in a first direction (for example, in the vertical direction) and a moving amount in a second direction (for example, in the horizontal direction) on the touch screen of the trajectory of a sliding operation, as a characteristic of the trajectory of the sliding operation.

The setting unit 52 sets at least one among a plurality of setting conditions of a photographing parameter (for example, the number of times photographing or a shift amount of the photographing parameter) according to the moving amount in the first direction thus distinguished, and sets at least one other among the plurality of setting conditions of the photographing parameter (for example, the range of the photographing parameter or the photographing order) according to the moving amount in the second direction.

In this way, it is possible to set a predetermined photographing parameter with a clear operation based on the direction of a sliding operation.

Furthermore, in the bracketing photography, photographing is performed a plurality of times while changing a combination of a plurality of values for each of a plurality of kinds of the photographing parameters.

Regarding the touch screen of the input unit 17, it is possible to perform a sliding operation in multiple dimensions.

The distinction unit 51 distinguishes a characteristic of a multiple-dimensional trajectory of one continuous multiple-dimensional sliding operation on a touch screen.

The setting unit 52 sets each of a plurality of values for each of a plurality of kinds of the photographing parameters used for the bracketing photography according to the characteristic of the trajectory of the one continuous sliding operation thus distinguished.

The photographing control unit 53 executes the bracketing photography with the plurality of values for each of the plurality of kinds of the photographing parameters thus set.

In this way, it becomes possible to easily set a plurality of kinds of photographing parameters for the bracketing photography by way of one sliding operation.

Furthermore, the photographing control unit 53 executes the bracketing photography for the number of times of photographing arrived at by combining a plurality of values (i.e., for the number of times equal to the number of combinations of a plurality of values) for each of a plurality of kinds of photographing parameters thus set.

In this way, it is possible to perform the bracketing photography by respectively combining the photographing parameters of a plurality of values for each of a plurality of kinds thus set by a simple operation.

Furthermore, the photographing control unit 53 executes the bracketing photography with a combination falling on the trajectory of a sliding operation from among the combinations of a plurality of values for each of a plurality of kinds of the photographing parameters thus set.

In this way, it becomes possible to perform the bracketing photography by automatically selecting a value that can be set for the bracketing photography.

Furthermore, each of the plurality of kinds of the photographing parameters corresponds to the respective dimensions among the multiple dimensions in which sliding is possible on the touch screen of the input unit 17.

The distinction unit 51 distinguishes the characteristic of a trajectory composed of a multiple-dimensional coordinates passed through by the trajectory of a sliding operation on the touch screen of the input unit 17 that is one continuous multiple-dimensional sliding operation.

In this way, it becomes possible to easily set the photographing parameters of multiple-dimensional bracketing photography.

It should be noted that the present invention is not to be limited to the aforementioned embodiment, and that modifications, improvements, etc. within a scope that can achieve the objects of the present invention are also included in the present invention.

In the abovementioned embodiment, although an explanation is provided by giving an example of a case of displaying a multi-level value for a photographing parameter as the scale in a sliding operation area, the present invention is not limited thereto. For example, it may also be configured so that the multi-level scale of a photographing parameter is formed (printed, molded, etc.) on a housing around the display screen, and a sliding operation area is identified and displayed in a region on the display screen corresponding to the scale.

In this way, a user can recognize that the same region on the display screen is always the sliding operation area, and thus it becomes possible to easily set the values of a photographing parameter.

Furthermore, in the abovementioned embodiment, it is possible to set a photographing parameter corresponding to an intermediate location with respect to the start location and the end location of a sliding operation. At this time, if a multi-level value of the photographing parameter does not correspond to an intermediate location of the sliding operation, such as if an even number of the multi-level values of the photographing parameter are included in the range of the photographing parameter set by the sliding operation, it is possible to adopt a value of the photographing parameter which is closer to the intermediate location in the range of the photographing parameter.

In this way, it is still possible to set the values of a photographing parameter appropriately even when the ranges of various photographing parameters are set by a sliding operation.

Furthermore, in the abovementioned embodiment, it is possible to set a photographing parameter used for the bracketing photography in which all of the values are shifted to the plus side or the minus side, without including values that do not cause the photographing parameter to be changed (i.e. a standard photographing parameter for the bracketing photography), in the photographing parameter set by the sliding operation.

In this way, it is possible to set a range of a photographing parameter more flexibly according to a user's requirements. For example, in a case of becoming underexposed with automatic exposure control due to, for example, standard centrally weighted photometry or average photometry as in backlighting, and thus minus correction has no effect, it becomes possible to perform a fine setting only with plus correction without limiting the center value to an appropriate value measured by the automatic exposure control.

Furthermore, it is possible to realize the photographing apparatus 1 by combining each of the abovementioned embodiments and each of the modified examples.

In such a case, it is possible to realize a photographing apparatus for which a photographing parameter can be set appropriately with more complex functions.

In the aforementioned embodiments, the digital camera has been described as an example of the image capture apparatus 1 to which the present invention is applied, but the present invention is not limited thereto in particular.

For example, the present invention can be applied to any electronic device in general having a bracketing photography function. More specifically, for example, the present invention can be applied to a lap-top personal computer, a video camera, a portable navigation device, a smart phone, a cell phone device, a smart phone, a portable gaming device, and the like.

The processing sequence described above can be executed by hardware, and can also be executed by software.

In other words, the hardware configuration shown in FIG. 2 is merely an illustrative example, and the present invention is not particularly limited thereto. More specifically, the types of functional blocks employed to realize the above-described functions are not particularly limited to the example shown in FIG. 2, so long as the image capture apparatus 1 can be provided with the functions enabling the aforementioned processing sequence to be executed in its entirety.

A single functional block may be configured by a single piece of hardware, a single installation of software, or any combination thereof.

In a case in which the processing sequence is executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable medium 31 shown in FIG. 1 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), or the like. The magnetic optical disk is composed of an MD (Mini-Disk) or the like. The storage medium supplied to the user in a state incorporated in the device main body in advance may include, for example, the ROM 12 shown in FIG. 1, a hard disk included in the storage unit 20 shown in FIG. 1 or the like, in which the program is recorded.

It should be noted that, in the present specification, the steps describing the program recorded in the storage medium include not only the processing executed in a time series following this order, but also processing executed in parallel or individually, which is not necessarily executed in a time series.

Although some embodiments of the present invention have been described above, the embodiments are merely exemplification, and do not limit the technical scope of the present invention. Other various embodiments can be employed for the present invention, and various modifications such as omission and replacement are possible without departing from the spirits of the present invention. Such embodiments and modifications are included in the scope of the invention and the summary described in the present specification, and are included in the invention recited in the claims as well as the equivalent scope thereof.

What is claimed is:

1. A photographing apparatus that can perform bracketing photography which performs photographing for a plurality of times while changing a value of a photographing parameter, comprising:
   a touch screen that allows a user to perform a sliding operation according to touch on the touch screen; and
   a controller having:
   a distinction section that distinguishes an intermediate location of a trajectory of the sliding operation on the touch screen as a characteristic of the trajectory of the sliding operation, wherein the intermediate location is where the sliding operation is paused for a predetermined time period;
   a deciding parameter range section that decides a photographing parameter range between the photographing parameters next to each other for a bracketing photography operation according to the distinguished intermediate location of the trajectory of the sliding operation on the touch screen; and
   a photographing control section that controls execution of the bracketing photography operation using the photographing parameters for the bracketing photography operation.

2. The photographing apparatus according to claim 1, wherein;
   the setting section that sets the plurality of values selected among the photographing parameter range, based on another characteristic of the sliding operation.

3. A photographing apparatus according to claim 1, wherein
   the distinction section distinguishes a location of a start point and a location of an end point of the sliding operation on the touch screen as a characteristic of a trajectory of the sliding operation on the touch screen which is one continuous sliding operation;
   the deciding parameter range section that determines a photography parameter range accordingly to the respective distinguished location of the start point and the end point on the touch screen;
   the controller further has a setting section that sets a plurality of values of the photography parameter range determined by the deciding parameter range section; and
   the photographing control section controls execution of the bracketing photography operation with the set plurality of values of the photographing parameter range.

4. The photographing apparatus according to claim 3, wherein
   the touch screen is laminated on a display section, and
   the photographing apparatus further comprises a display control section that performs display that can identify a value or a range for which the photographing parameter set by the setting section can be set, on the display section.

5. The photographing apparatus according to claim 3, wherein
   the setting section sets a maximum value or a minimum value, at least as one among the plurality of values of the photographing parameter.

6. The photographing apparatus according to claim 3, wherein
   the setting section sets one among the plurality of values of the photographing parameter set, to be a value closer to an intermediate value among values of the photographing parameter that can be set.

7. The photographing apparatus according to claim 3, wherein
   the distinction section further distinguishes a transitting location of a trajectory of the sliding operation as a characteristic of the trajectory of the sliding operation, and
   the setting section further sets an order in which to change the plurality of values of the photographing parameter as an order to perform the bracketing photography, according to the distinguished transitting location of the trajectory of the sliding operation.

8. The photographing apparatus according to claim 3, wherein
   the distinction section further distinguishes a direction of a trajectory of the sliding operation as a characteristic of the trajectory of the sliding operation, and
   the setting section further sets an order in which to change the plurality of values of the photographing parameter as an order to perform the bracketing photography, according to the distinguished direction of the trajectory of the sliding operation.

9. The photographing apparatus according to claim 3, wherein
   the setting section further sets a shift amount of the plurality of values that is the photographing parameter, according to the distinguished speed of the sliding operation.

10. The photographing apparatus according to claim 3, wherein, when there is a pause of at least a predetermined period of time during the sliding operation, the distinction section further distinguishes a location on the touch input section at which there was the pause as a characteristic of a trajectory of the sliding operation, and
    the setting section further sets at least one among the plurality of values of the photographing parameter according to the location distinguished on the touch screen.

11. The photographing apparatus according to claim 3, wherein
    the setting section sets the plurality of values of the photographing parameter without including an intermediate value among values of the photographing parameter that can be set.

12. The photographing apparatus according to claim 3, wherein
    the distinction section further distinguishes a moving amount in a first direction and a moving amount in a second direction on the touch screen of a trajectory of the sliding operation, as a characteristic of the trajectory of the sliding operation, and
    the setting section further sets at least one among a plurality of setting conditions of the photographing parameter according to the moving amount in the first direction distinguished and sets at least one other among the plurality of setting conditions of the photographing parameter according to the moving amount in the second direction.

13. A photographing apparatus that can perform bracketing photography which performs photographing for a plurality of times while changing a plurality of combinations made by combining a plurality of values for each kind of a plurality of photographing parameters, comprising:
   a touch screen that allows user to perform a sliding operation by a touch in multiple dimensions on the touch screen; and
   a controller having:
   a distinction section that distinguishes a location of a start point and a location of an end point of the sliding operation on the touch screen as a characteristic of a trajectory of the sliding operation in multiple dimensions on the touch screen that is one continuous sliding operation, the distinction section further distinguishing an intermediate location of the trajectory of the sliding operation on the touch screen as a characteristic of the trajectory of the sliding operation, wherein the intermediate location is where the sliding operation is paused for a predetermined time period;
   a deciding parameter range section that determines a photographing parameter range according to the respective distinguished locations of the start point and the end point on the touch screen, and further decides a photographing parameter range between the photographing parameters next to each other for a bracketing photography operation according to the distinguished intermediate location of the trajectory of the sliding operation on the touch screen;
   a setting section that sets each of a plurality of combinations made by combining a plurality of values for each of a plurality of kinds of the photographing parameters of the determined photographing parameter range used for the bracketing photography operation; and
   a photographing control section that controls execution of the bracketing photography operation with the set plurality of combinations, and further controls execution of the bracketing photography operation using the photographing parameters for the bracketing photography operation.

14. The photographing apparatus according to claim 13, wherein
   the photographing control section executes the bracketing photography operation for a number of times equal to a number of combinations of a plurality of values for each kind among a plurality of kinds of the set photographing parameters.

15. The photographing apparatus according to claim 13, wherein
   the photographing control section executes the bracketing photography operation with a combination on a trajectory of the sliding operation, from among combinations of a plurality of values for each kind among a plurality of kinds of the set photographing parameters.

16. The photographing apparatus according to claim 13, wherein
   each kind among a plurality of kinds of the photographing parameters corresponds to a respective dimension among multiple dimensions in which sliding can be on the touch screen, and
   the distinction section distinguishes a characteristic of a trajectory composed of multiple-dimensional coordinates passed through by the trajectory of the sliding operation on the touch screen that is one continuous multiple dimensional sliding operation.

17. A photographing method executed by a photographing apparatus that can perform bracketing photography which performs photographing for a plurality of times while changing values of a photographing parameter, the photographing apparatus including a touch screen that allows a user to perform a sliding operation according to touch on the touch screen, the method comprising the steps of:
   distinguishing an intermediate location of a trajectory of the sliding operation on the touch screen as a characteristic of the trajectory of the sliding operation, wherein the intermediate location is where the sliding operation is paused for a predetermined time period;
   deciding a photographing parameter range between the photographing parameters next to each other for a bracketing photography operation according to the distinguished intermediate location of the trajectory of the sliding operation on the touch screen; and
   controlling execution of the bracketing photography operation using the photographing parameters for the bracketing photography operation,
   wherein each of the foregoing steps is performed by a controller of the photographing apparatus.

18. A photographing method executed by a photographing apparatus that can perform bracketing photography which performs photographing for a plurality of times while changing a plurality of combinations made by combining a plurality of values for each kind of a plurality of photographing parameters, the photographing apparatus including a touch screen that allows a user to perform a sliding operation according to touch in multiple dimensions on the touch screen, the method comprising the steps of:
   distinguishing a location of a start point and a location of an end point of the sliding operation on the touch screen as a characteristic of a trajectory of the sliding operation in multiple dimensions on the touch screen that is one continuous sliding operation;
   distinguishing an intermediate location of the trajectory of the sliding operation on the touch screen as a characteristic of the trajectory of the sliding operation, wherein the intermediate location is where the sliding operation is paused for a predetermined time period;
   determining a photographing parameter range according to the respective distinguished locations of the start point and the end point on the touch screen;
   deciding a photographing parameter range between the photographing parameters next to each other for a bracketing photography operation according to the distinguished intermediate location of the trajectory of the sliding operation on the touch screen;
   setting each of a plurality of combinations made by combining a plurality of values for each of a plurality of kinds of the photographing parameters of the determined photographing parameter range used for the bracketing photography operation; and
   controlling execution of the bracketing photography operation according to the set plurality of combinations and using the photographing parameters for the bracketing photography operation,
   wherein each of the foregoing steps is performed by a controller of the photographing apparatus.

19. A non-transitory storage medium encoded with a computer readable program enabling a computer, which controls a photographing apparatus that can perform bracketing photography which performs photographing for a plurality of times while changing values of a photographing parameter and that includes a touch screen that allows a user to perform a sliding operation by a touch on the touch screen, to perform the following functions:

- a distinction function that distinguishes an intermediate location of a trajectory of the sliding operation on the touch screen as a characteristic of the trajectory of the sliding operation, wherein the intermediate location is where the sliding operation is paused for a predetermined time period;
- a deciding parameter range function that decides a photographing parameter range between the photographing parameters next to each other for a bracketing photography operation according to the distinguished intermediate location of the trajectory of the sliding operation; and
- a photographing function that controls execution of the bracketing photography operation using the photographing parameters for the bracketing photography operation.

20. A non-transitory storage medium encoded with a computer readable program enabling a computer, which controls a photographing apparatus that can perform bracketing photography which performs photographing for a plurality of times while changing a plurality of combinations made by combining a plurality of values for each kind of a plurality of photographing parameters and that includes a touch screen that allows a user to perform a sliding operation according to touch in multiple dimensions on the touch screen, to perform the following functions:

- a distinction function that distinguishes a location of a start point and a location of an end point of the sliding operation on the touch screen as a characteristic of a trajectory of the sliding operation in multiple dimensions on the touch screen that is one continuous sliding operation, and further distinguishes an intermediate location of the trajectory of the sliding operation on the touch screen as a characteristic of the trajectory of the sliding operation, wherein the intermediate location is where the sliding operation is paused for a predetermined time period;
- a deciding parameter range function that determines a photographing parameter range according to the respective distinguished locations of the start point and the end point on the touch screen, and further decides a photographing parameter range between the photographing parameters next to each other for a bracketing photography operation according to the distinguished intermediate location of the trajectory of the sliding operation on the touch screen;
- a setting function that sets each of a plurality of combinations made by combining a plurality of values for each of a plurality of kinds of the photographing parameters of the determined photographing range used for the bracketing photography operation; and
- a photographing control function that controls execution of the bracketing photography with the set plurality of combinations, and further controls execution of the bracketing photography operation using the photographing parameters for the bracketing photography operation.

* * * * *